United States Patent [19]

Watanabe et al.

[11] 4,191,455
[45] Mar. 4, 1980

[54] MANUAL RETRIEVING MECHANISM FOR MICROFICHE READER APPARATUS OR THE LIKE

[75] Inventors: Yutaka Watanabe; Seiichi Yamagishi, both of Tokyo; Shiro Toriumi, Machida, all of Japan

[73] Assignee: Minolta Camera Kabushiki Kaisha, Osaka, Japan

[21] Appl. No.: 943,902

[22] Filed: Sep. 19, 1978

[30] Foreign Application Priority Data

Sep. 30, 1977 [JP] Japan .................. 52/118015
Jun. 12, 1978 [JP] Japan .................. 53/80957[U]

[51] Int. Cl.² ............................ G03B 23/08
[52] U.S. Cl. ................................ 353/27 A
[58] Field of Search ............... 353/27 R, 27 A, 25 R

[56] References Cited

U.S. PATENT DOCUMENTS

| 2,501,453 | 3/1950 | Rowe et al. | 353/27 R |
| 2,701,979 | 2/1955 | Pratt et al. | 353/27 R |
| 3,856,397 | 12/1974 | Suzuki et al. | 355/45 |
| 4,033,684 | 7/1977 | Toriumi et al. | 353/27 A |

*Primary Examiner*—Harry N. Haroian
*Attorney, Agent, or Firm*—Wolder, Gross & Yavner

[57] ABSTRACT

A microfiche reader includes an automatic motor driven retriever mechanism and a manual retriever mechanism. The manual retriever includes a guide having a transverse slot, a lever handle having a longitudinal slot and a pivot member slideable along the slots and supporting the lever for swinging between retracted and extended positions. A film carrier carriage is moveable along orthogonally related directions and is releasably couplable to the lever when the carriage is in a retracted rest position, the lever being locked to the carriage when the carriage is displaced from its rest position. The lever is locked in an inoperative condition when retracted and with the carriage displaced from rest position. A mechanism is provided for uncoupling the motors from the carriage or the carriages are coupled to the motors by slip transmissions or a switch is provided for deenergizing the automatic retriever mechanisms when the manual lever is in an operative position.

10 Claims, 18 Drawing Figures

MANUAL RETRIEVING MECHANISM FOR MICROFICHE READER APPARATUS OR THE LIKE

The present invention relates generally to improvements in manual retrieving mechanisms for microfiche reader apparatus or the like incorporating an automatic retrieving mechanism, and it relates more particularly to an improved manual retrieving mechanism adapted for use with microfiche films of any format and to safety means thereof.

Automatic retrieving mechanisms for reader apparatus, reader-printer apparatus or the like, as disclosed in U.S. Pat. No. 4,033,684, comprise a first carriage moveable in an X direction and including a stationary glass member and a holding glass member for holding a microfiche film therebetween, a second carriage moveable in a Y direction perpendicular to the X direction with the first carriage moveably supported thereon, and drive means including a motor, cable and the like for driving each of the carriages to bring the desired frame on the film to the projection position. For the movement of the carriages, each frame on the microfiche film is represented by symbols indicating the row and line in which the frame is positioned, such that when it is desired to project a frame, for example in Row A, Column 3, the buttons corresponding to the Row A and Column 3 are depressed to drive the carriages in the X and Y directions by amounts corresponding to the positions of the Row A and Line 3.

Such an automatic retrieving mechanism is very convenient in bringing the desired frame to the projection position quickly and accurately. However, the aforesaid mechanism has the drawback of being usable only with microfiche films of a specific format. Because microfiche films have not been standardized to a single format but are available to different formats, a particular retrieving mechanism is unable to properly project films which differ from those for which the mechanism is designed in the number of frames or frame feeding pitch, hence resulting in great inconvenience.

The above drawback could be overcome by the provision of a suitable manual retrieving mechanism which is adapted for use with microfiche films of any format, but the apparatus would still involve the likelihood that the automatic mechanism would malfunction during manual retrieval or conversely that the manual mechanism would malfunction during automatic operation.

SUMMARY OF THE INVENTION

A main object of the present invention is to overcome the foregoing problems and to provide an improved novel manual retrieving mechanism for a reader, reader-printer and like apparatus having an automatic retrieving mechanism to enable the apparatus to properly project microfilms of any format.

Another object of the present invention is to provide an improved manual retrieving mechanism which is adapted for use in reader apparatus and the like and which is easy to operate and simple in construction.

Another object of this invention is to provide an improved safety mechanism for ensuring the operation of reader apparatus, reader-printer apparatus, etc. with improved safety.

The above and other objects of the present invention can be fulfilled by a mechanism comprising a manual retrieving lever which is movable in the X and Y directions and which, when connected to the microfiche carrier means and manually operated, moves the carrier means to bring a microfiche film of any format to the projection position.

The objects of the invention can be achieved also by a mechanism consisting essentially of a member for locking a manual retrieving lever in a lever accommodating portion, a member for releasing the manual retrieving lever from the locking member when an automatic retrieving mechanism is non-operational, and a switching member for permitting the operation of the automatic retrieving mechanism only while the manual retrieving lever is retained in the accommodating portion.

For a fuller understanding of the nature and objects of the present invention, reference is made to the following detailed description taken in conjunction with the accompanying drawings which illustrate preferred embodiments of the invention and in which like reference numerals are used to designate like parts.

DESCRIPTION OF THE PREFERRED EMBODIMENTS

Figure 1:
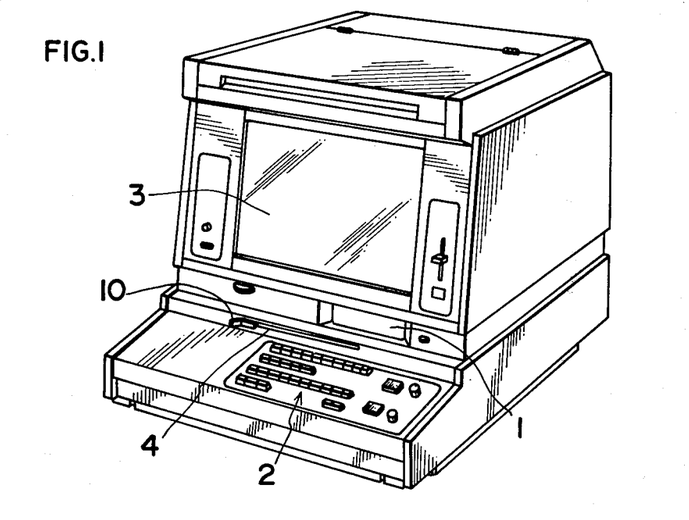
FIG. 1 is a perspective view of a microfiche reader apparatus provided with a manual retrieving mechanism and safety means therefor according to the present invention.

Referring now to the drawings, particularly FIGS. 1 to 4 thereof which illustrates a preferred embodiment of the present invention, FIG. 1 shows the reader apparatus including an automatic retrieving mechanism such as that disclosed in U.S. Pat. No. 4,033,684 and provided with a manual retrieving mechanism and safety means therefor according to the present invention. The reader apparatus may incorporate a copying unit such as that described in U.S. Pat. No. 3,856,397 to serve as a reader-printer apparatus.

The apparatus has an access opening or inlet 1 through which a microfiche film is inserted into the apparatus alike for automatic retrieval and for manual retrieval. When the microfiche film is of usual format, operating buttons 2 are depressed to specify the desired frame for automatic retrieval, whereupon the microfiche supporting first and second carriages to be described later are moved in the X and Y directions respectively to bring the specified frame to the projection position. The frame is projected onto a viewing screen 3. Microfiche films other than those of specified format can be projected onto the screen 3 with the use of the manual retrieving mechanism of the present invention. For manual retrieval, a manual retrieving lever 10 accommodated in a front opening 4 of the apparatus is withdrawn.

Figure 2:
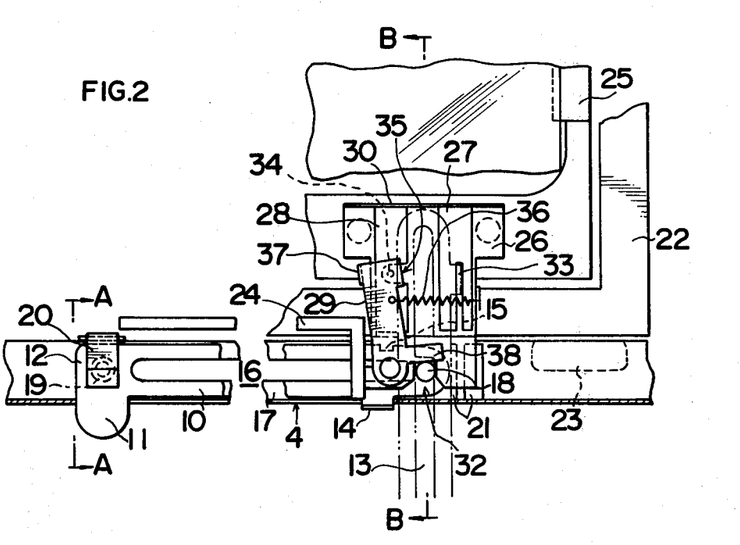
FIG. 2 is a fragmentary sectional view of the manual retrieving mechanism to show the relation between a manual retrieving lever and first and second carriage connected thereto.

As seen in FIG. 2, the manual retrieving lever 10 is in the form of an enlongated plate having a knob 11, a hole 12 for retaining the lever in the opening 4, an elongated slot 13, a guide portion 14 and a cutout 15 for holding the lever during manual retrieval.

A guide plate 17 formed with an elongated slot 16 is fixedly provided inside the opening 4. The lever 10 is slidable in both X and Y directions by a lever sliding pivot 18 slidably engaging both slots 13 and 16. The main body of the retrieving unit is provided with a click ball 19 engageable in the hole 12 of the lever under the slight pressure of a leaf spring 20 (see FIG. 3), a guide plate 21 for guiding the lever 10 into the restraining means to be described later, a magnet 23 for attracting a second carriage 22 which is movable in the Y direction and a guide member 24 for guiding the restraining means to a position where the lever engages the restraining means.

A first carriage 25 movable in the X direction includes a stationary glass member 84 and an openable holding glass member 82 (see FIG. 9) for holding the microfiche therebetween. The second carriage 22 which is moveable in the Y direction perpendicular to the X direction supports the first carriage 25 thereon. Both carriages are driven by the automatic retrieving mechanism when connected thereto and are disconnected therefrom for manual retrieval by the mechanism to be described later.

The restraining means mounted on the first carriage 25 comprises a lower restraining plate 26 and upper restraining plates 27 and 28 and is provided with a latch lever 29. The lower restraining plate 26 resembles a ladle in section and has a front restraining portion 30, a lever inlet 31 and a positioning cutout 32. The upper restraining plate 27 has a groove 23 for engagement by the guide portion 14 of the manual retrieving lever 10. The upper restraining plate 28 is formed with a groove 35 for permitting the retraction of an engaging pin 34 on the latch lever 29. The latch lever 29 is pivoted to the lower restraining plate 26 and biased by a spring 36 in a clockwise direction as viewed in FIG. 2. The pivotal movement of the latch lever 29 is limited by the contact of a downwardly bent portion 37 with the upper restraining plate 28. The latch lever 29 further has an arm 38 which comes into contact with the lever sliding pivot 18 to retract the engaging pin 34 from an engaging position when the manual retrieving lever 10 is fitted into the restraining means.

When the mechanism described above is used for manual retrieval, the first carriage 25 is moved to bring the positioning cutout portion 32 of the lower restraining plate 26 into engagement with the lever sliding pivot 18. The first carriage 25 is held in this position by the guide member 24 and magnet 23. The drive system disengaging mechanism to be described later is then operated to render the carriages freely moveable.

With the parts positioned as above, the lever 10 is held by the knob 11, withdrawn and turned through 90 degrees about the pivot 18, and pushed into the restraining means.

The guide portion 14 of the lever 10 is guided by the guide plate 21 on the main body and then fits into the groove 33 of the upper restraining plate 27. Thus the lever 10 advances into abutting contact with the forward restraining portion 30 while being restrained from sidewise movement by the groove 33 and from vertical movement by the upper and lower restraining plates 26, 27 and 28. During this movement, the latch lever 29 is held retracted from latching position by the contact of the arm 38 with the pivot 18.

When the lever 10 is further pushed in, both first and second carriages 25 and 22 move in the Y direction, moving the arm 38 out of contact with the pivot 18 and bringing the pin 34 into engagement with the cutout 15 of the lever 10 to connect the lever 10 to the first carriage 25.

Consequently the first carriage 25 bearing the microfiche film is freely movable in the X and Y directions by manually operating the manual retrieving lever 10 to bring the desired frame to the projection position.

Preferably the lever 10 is connected to the first carriage 25 in the position in which the microfiche is loaded on the first carriage 25 although it is connectable to the carriage in some other position. This is advantageous in that a microfiche of unspecified format is manually retrievable on placement on the carriage.

With the manual retrieving mechanism described above, the manual retrieving lever movable in the X and Y directions is fitted into restraining means on the microfiche carriage and is coupled to the restraining means by the latch lever on the restraining means. However, the mechanism can be modified without departing from the concept of the present invention. For example, the latch lever, which is provided on the restraining means, can be mounted on the manual retrieving lever 10. The lever 10 may be provided independently of the main body as a separate member.

Figures 5A, 5B, 6:
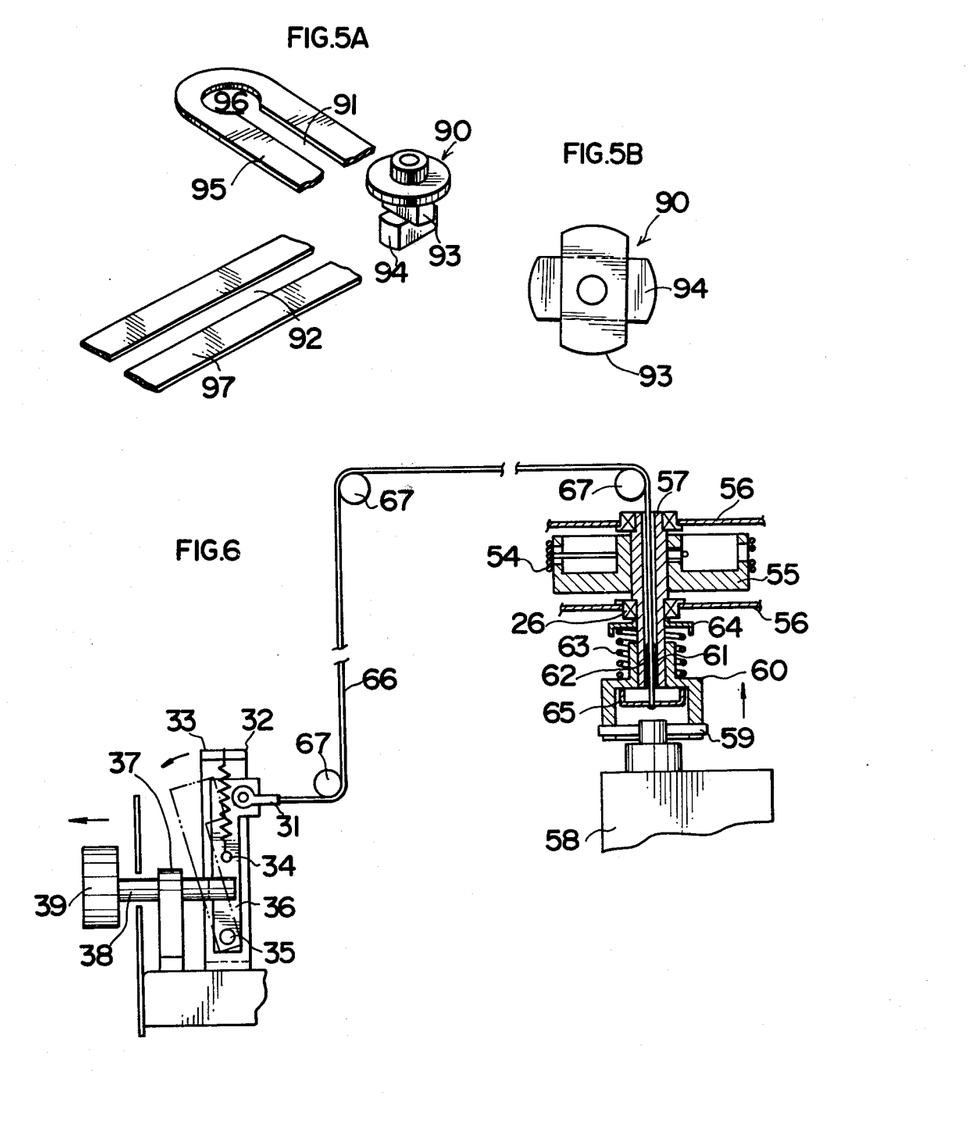
FIGS. 5A and 5B are fragmentary perspective and plan views respectively of another manual retrieving lever and a lever sliding pivot embodying the present invention showing the relation therebetween.
FIG. 6 is a partial sectional view of a mechanism for disengaging the drive system of the automatic retrieving mechanism.

FIG. 5 shows another manual retrieving lever and a lever sliding pivot therefor embodying the present invention. The pivot 90 includes an elongated lever fitting portion 93 and an elongated guide plate fitting portion 94 at right angles to each other and having substantially the same width as the respectively slideably engaged elongated slots 91, 92 of the manual retrieving lever 95 and a guide plate 97. The pivot 90 is integrally formed from a solid cylinder by cutting the cylinder on opposite sides.

The slot 91 of the lever 95 is enlarged at its inner end to a circular aperture 96 which permits the turning of the lever 95 on the lever fitting portion 93. The lever 95 is therefore turnable only when the pivot 90 is engaged by the circular end aperture 96 of the lever, and the pivot 90, when otherwise positioned, restricts the lever 95 to slideable movement at right angles to the guide plate 97 whereby the lever is easily movable with high accuracy.

The automatic retrieving mechanism of the reader apparatus is adapted to automatically drive the first and second carriages by motors, which, even when out of operation necessitate an increased force to move the manual retrieving mechanism. It is accordingly desirable when the manual retrieval is employed to disconnect or uncouple the first and second carriages from the drive motors and render the carriages freely smoothly moveable. FIG. 6 shows a mechanism for disconnecting the drive system for this purpose. With reference to FIG. 6, a knob 50 provided outside the retrieving unit main body is connected by a bar 52 to a pivotable inner lever 51. The lever 51 is alternatively positioned in the solid-line position and in the broken-line position and as biased by a spring 53.

The power transmitting means of the automatic retrieving mechanism includes a drive wire 54 attached to the first (or second) carriage and is wound about a drive pulley 55, which is affixed on a transmitting shaft 57 supported on a frame 56 by suitable bearings. A transmitting pulley 60 opposed to an engaging member 59 on the output shaft of a motor 58 is vertically moveably mounted on the transmitting shaft 57 to define a releasable coupling. The transmitting pulley 60 is guided for vertical movement by the engagement of a guide pin 62 of the pulley 60 in a groove 61 of the shaft 57. A spring 63 and a spring abutment 64 are provided for biasing the transmitting pulley 60 into engagement with the engaging member 59 of the motor.

A wire 66 fastened at its one end to a wire holder 65 provided inside the transmitting pulley extends through the hollow interior of the transmitting shaft 57 over idle pulleys 67 and is connected to the lever 51. Since the first and second carriages are generally each provided with a respective motor, another drive system disengaging mechanism similar to the illustrated one is provided also for the other motor with its wire connected to the lever 51.

With the mechanism described above, the knob 50, when pulled, turns the lever 51 to the broken-line position and the lever is retained in this position. The swing of the lever 51 causes the wire 66 to pull the transmitting pulley 60 upward as viewed in FIG. 6 out of engagement with the coupling drive member 59 to release the first carriage (and the second carriage) for free and smooth movement, thus greatly facilitating manual retrieval.

In place of the above described mechanism for coupling the motor to the drive wire, a belt and a pulley are usable which are adapted to slip relative to each other when subjected to a load exceeding a predetermined magnitude.

Figure 7:
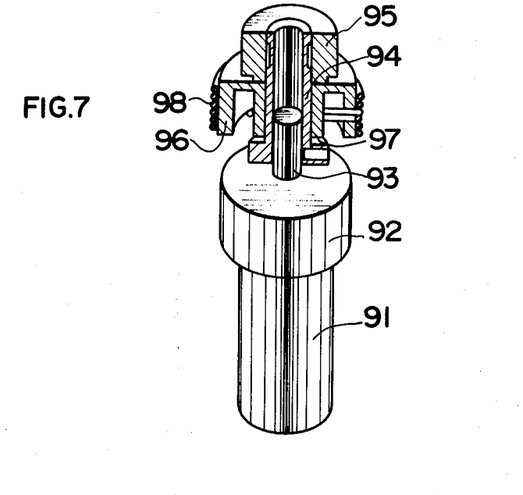
FIG. 7 is a partially sectioned perspective view showing a modified clutch means for use in the drive system disengaging mechanism of FIG. 6.

Alternatively, in place of the mechanism illustrated in FIG. 6, the clutch mechanism shown in FIG. 7 may be used to facilitate the movement of the carriages 25 and 22 for manual retrieval. With reference to FIG. 7, a drive motor 91 drives an output shaft 93 through a reduction gear 92. A coaxial tubular coupling shaft 94 engages and is connected to the output shaft 93 and is provided on its outer periphery with a preloading adjusting knob 95, a drive pulley 96 and a preloading spring 97. The load on the coupling shaft 94 is suitably adjusted by the knob 95. Wound on the drive pulley 96 is a drive wire 98 connected to the carriage 25 or 22. For automatic retrieval, the rotation of the output shaft 93 drives the knob, pulley and the like, while during manual retrieval the motor 91 which is deenergized permits the carriage to move smoothly with the drive pulley 96 slipping on the coupling shaft 94.

Figure 8:
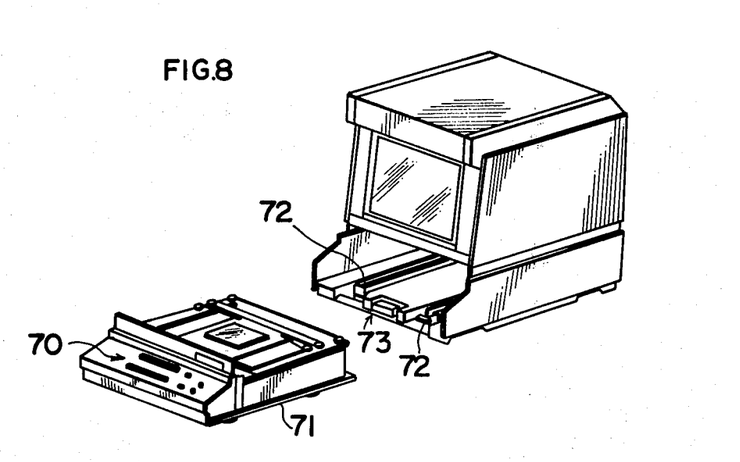
FIG. 8 is a perspective view showing the reader apparatus of FIG. 1 with its retrieving unit withdrawn.

While the reader apparatus normally operates in the manner described above, the retrieving unit in its entirey may be made detachable from the reader main body as seen in FIG. 8 so that manual retrieval can be performed with the foregoing manual mechanism when the motor or the like for driving the first or second carriage malfunctions.

With reference to FIG. 8, the first and second carriages, automatic retrieving mechanism, manual retrieving mechanism, optical projection system, etc. are mounted on a frame 71 provided with an operating unit 70 in its front portion. The frame 71 has mounted on its bottom rollers so that the frame is moveable on rails 72 on the main body. The motors, light source and other electric means are coupled by a connector to the power source. The retrieving unit is retainable in position against inadvertent withdrawal by latch means 73.

Figure 9:
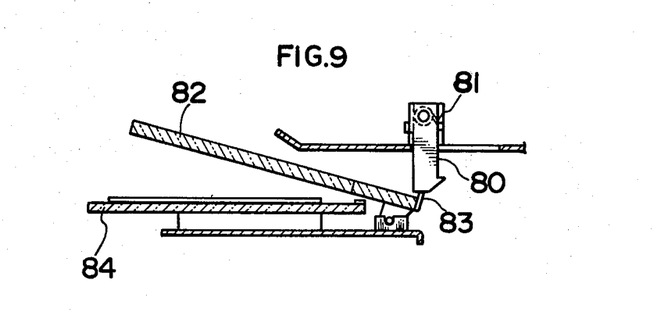
FIG. 9 is a sectional view of the main portion of the means for opening and closing a glass member for holding a microfiche film on the first carriage.

The microfiche retrieving unit is provided with a member for opening the microfiche holding glass member when the holding member has been brought to the film inlet position. The opening member may be provided on the retrieving unit. Alternatively a spring-loaded opening lever 80 which is pivotably moveable in only one direction may be disposed on the main body of the apparatus as illustrated in FIG. 9. The opening lever 80 is biased by a spring in a clockwise direction and pivotably moveable only in a counter-clockwise direction as viewed in FIG. 9. When opening or closing the holding glass member 82 in the usual manner, the opening lever 80 engages a projection 83 on the rear edge of the holding glass member 82. When the retrieving unit is withdrawn and inserted into place again, the projection 83 engages the lower trailing portion of the lever 80 and while advancing swings the lever counter-clockwise. Upon the projection 83 moving past the lever 80, the lever returns to its original position under the action of the spring 81.

With the detachable retrieving unit described above, films are manually retrievable even when the motor or the like malfunctions, rendering the automatic retrieving mechanism inoperative, by detaching the retrieving unit, moving the first carriage provided with the coupling means to the lever fitting position and connecting the manual retrieving lever to the first carriage in the manner described.

The detachable unit is also advantageous in that dust on the holding glass member, lens or the like, is easily removeable therefrom without the necessity of disassembling the whole apparatus.

Briefly, according to the present invention which provides a manual retrieving mechanism for a microfiche reader, reader-printer or like apparatus equipped with an automatic retrieving mechanism, a lever which is moveable in both X and Y directions is adapted to be connected to a microfiche carriage means so that the film can be retrieved by operating the lever from outside the apparatus. Microfiche films different from those specified in frame arrangement or in frame feeding pitch can therefore be accurately guided to the projection position.

The drive system disengaging mechanism, when constructed to disconnect the microfiche carriage means from the automatic retrieving drive system, renders the carriage means moveable free of the resistance of the drive system, assuring a very smooth easy manual retrieving operation.

The construction in which the overall retrieving unit is detachable from the apparatus main body has the advantage of permitting manual retrieval even in the event of the malfunctioning of the automatic retrieving mechanism.

FIGS. 10 to 17 illustrate embodiment of the present invention in which the reader apparatus shown in FIG. 1 incorporates safety means for manual and automatic retrieval.

Figure 10:
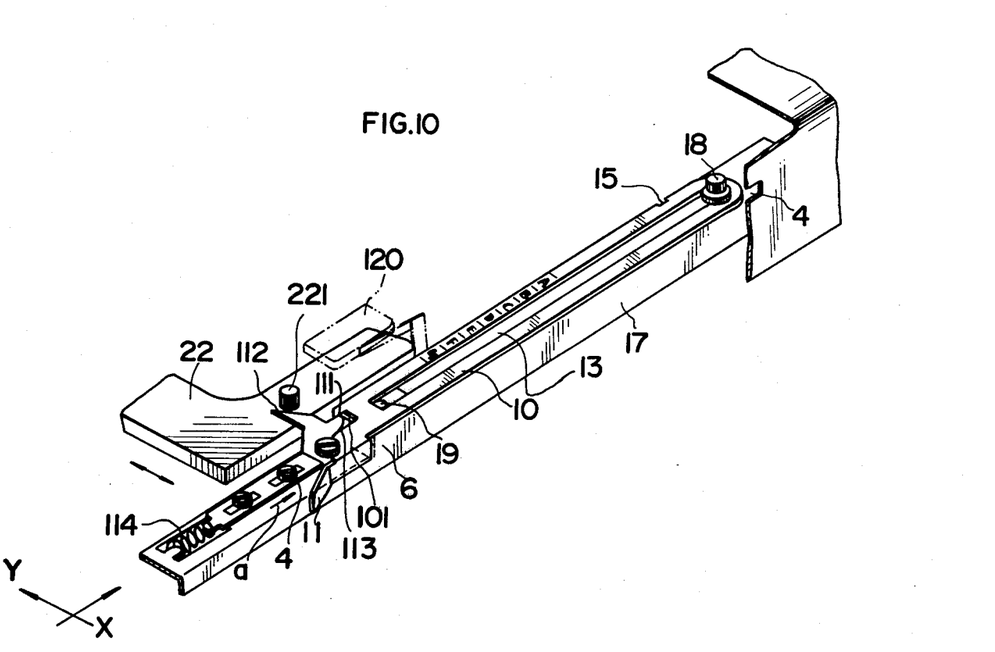
FIG. 10 is a fragmentary perspective view of the manual retrieving mechanism according to another embodiment of the present invention with the manual operating lever shown in a retracted position.
Figure 11:
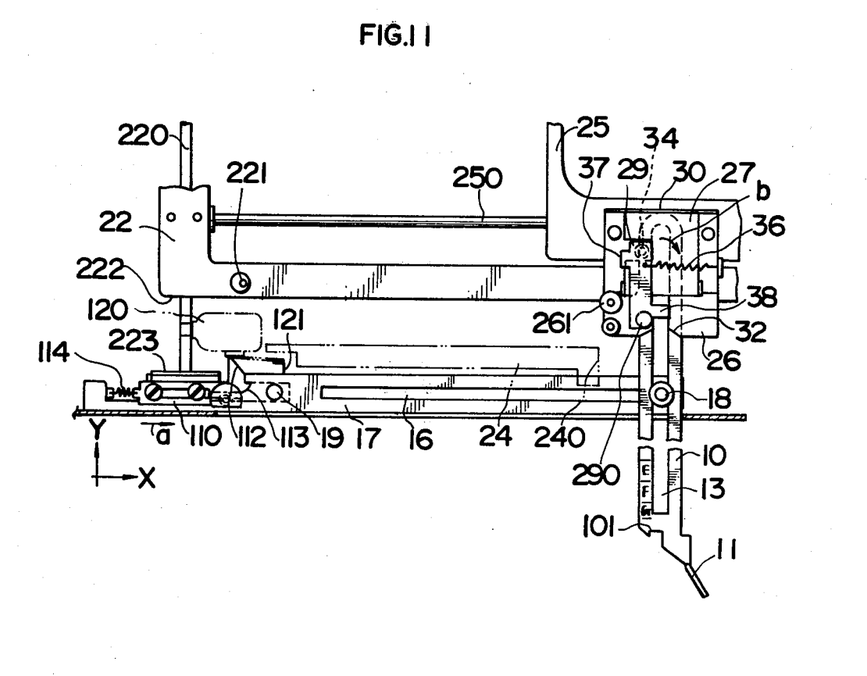
FIG. 11 is a top plan view thereof with the operating lever shown in extended operative carrier coupled position.
Figure 12:
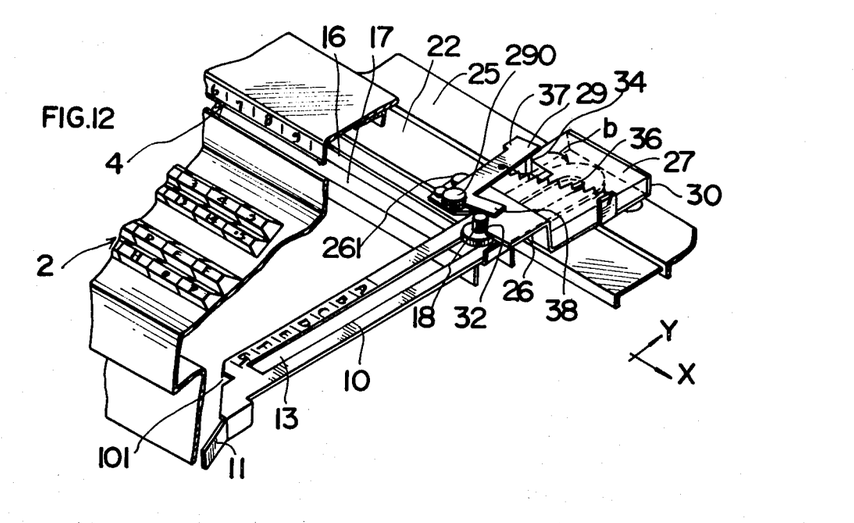
FIG. 12 is a front fragmentary perspective view showing the lever carrier coupling in unlocked condition.
Figures 13, 14:
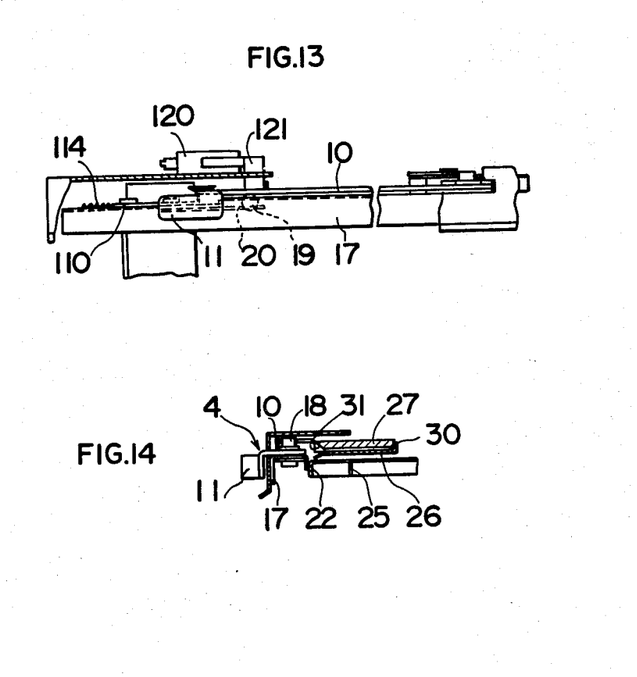
FIG. 13 is a fragmentary front elevational view with the retrieving lever in retracted position.
FIG. 14 is a fragmentary transverse sectional view thereof.

The manual retrieving lever 10 to be withdrawn from the opening 4 for manually retrieving microfiche films of unspecified format is in the form of an elongated plate having a knob 11, an elongated slot 13, a cutout 15 for holding the lever during manual retrieval and a locking cutout 101 as seen in FIG. 10.

A guide plate 17 formed with an elongated slot 16 is secured to the main body inside the opening 4. A lever sliding pivot 18 slideably engaging both elongated slots 13 and 16 is moveable along the slot 16 in an X direction. The lever 10 is supported by and turnable on the pivot 18 when it is accommodated into the opening 4 or withdrawn therefrom. The pivot 18 also serves as a guide for the lever 10 when it is moved in X and Y directions for manual retrieval.

Also provided on the main body inside the opening 4 are a click ball 19 lightly engageable in the slot 13 of the lever 10, a leaf spring 20 for biasing the ball 19 (see FIG. 13), a locking plate 110 engageable in the cutout 101 of the lever 10 to lock the lever 10 in its accommodating portion and a microswitch 120 which is actuated when the lever 10 has been retracted into the accommodating portion.

The locking plate 110 has an engaging portion 111 engageable in the cutout 101 of the lever 10 and cam portions 112 and 113. The lever 110 is biased by a spring 114 in the direction of the arrow a, namely in the locking direction. The microswitch 120 has an actuating piece 121 fixed to the free end of its actuator and is actuated by the contact of the piece 121 with a side portion of the manual retrieving lever 10, permitting the operation of the automatic retrieving mechanism only while the lever 10 is retained in the accommodating portion.

A first carriage 25 and a second carriage 22 are coupled to the automatic retrieving mechanism and are moveable in the X and Y directions respectively. The first carriage 25 is slideable on a slide rail 250 secured to the second carriage 22, and the second carriage 22 is slideable on a slide rail 220 fixedly mounted on the main body.

The second carriage 22 is fixedly provided with an unlocking pin 221 adapted to engage the cam portion 112 of the locking plate 110 to move the plate 110 in the opposite direction to the arrow a out of engagement with the cutout 101 of the lever 10 against the action of the spring 114, thereby permitting the withdrawal of the lever 10 from the accommodating portion. The engagement of the unlocking pin 221 with the lever cam portion 112 occurs when the front side face 222 of the second carriage 22 engages a position determining plate 223 fixed to the main body when the carriage 22 moves downward as viewed in FIG. 13, namely when the carriage 22 has been brought to the position shown in FIG. 15.

Figure 16:
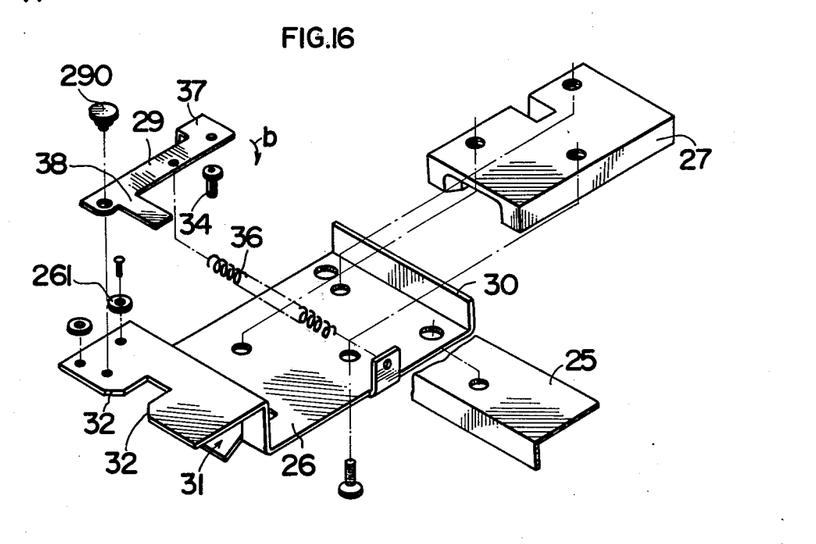
FIG. 16 is an exploded perspective view of the carrier carriage manual lever coupling assembly.

Fixedly mounted on the first carriage 25 are a lower restraining plate 26 and an upper restraining plate 27 shown in greater detail in FIG. 16. The lower restraining plate 26 is in the form of a ladle and has a forward bent portion 30, an inlet 31 for the lever 10 and positioning tapered portions 32.

Figure 17:
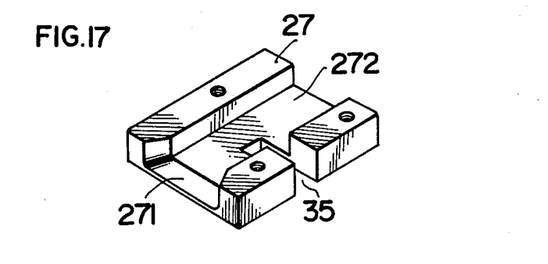
FIG. 17 is a bottom perspective view of a portion thereof.

The lower restraining plate 26 is provided with a guide roller 261 rollable on the guide face 240 of a guide plate 24 secured to the main body and with a latch lever 29 pivoted by a pin 290 to the plate 26 and biased by a spring 36 in the direction of the arrow b. The latch lever 29 has a downwardly bent portion 37, which when engaging a side portion of the upper restraining plate 27, limits the pivotal movement of the lever 29. The latch lever 29 is provided with an engaging pin 34 engageable in the cutout 15 of the lever 10 when the lever is coupled to the restraining means and has an arm 38 adapted to engage the lever sliding pivot 18 to move the latch lever 29 in a direction opposite to the arrow b against the action of the spring 36, holding the pin 34 out of engagement with the cutout 15. The engagement of the arm 38 with the pivot 18 occurs under the same conditions as the contact of the unlocking pin 221 with the cam portion 112 of the locking plate 110. As seen in FIG. 17 which shows the bottom of the upper restraining plate 27, the plate 27 has a tapered portion 271 at the inlet of the lever 10, a groove 272 for receiving the lever 10 and a cutout 35 for engagement by the pin 34.

The functioning of the components of the foregoing construction is hereinafter described in detail with reference to the changeover from automatic to manual retrieval.

Figure 15:
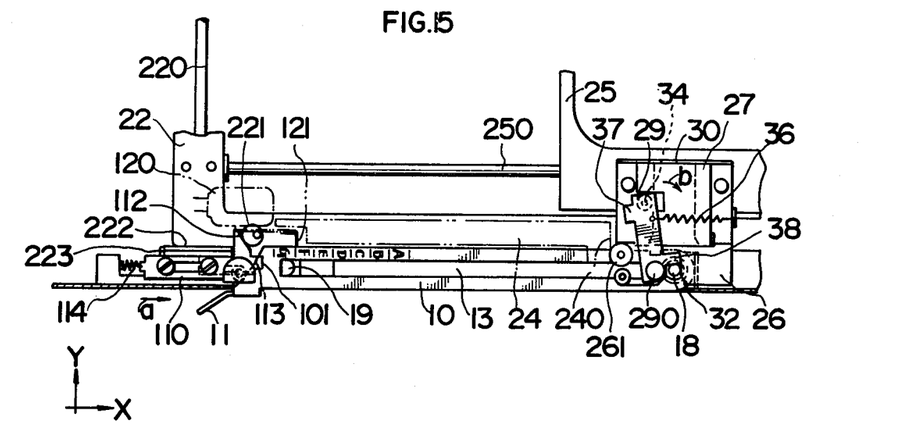
FIG. 15 is a view similar to FIG. 11 but with the manual lever shown in retracted position.

When the first carriage 25 and the second carriage 22 are in the positions shown in FIG. 15 on completion of automatic retrieval or while the reader apparatus is out of operation, the unlocking pin 221 is in engagement with the cam portion 112 of the locking lever 110, holding the lever 110 out of engagement with the cutout 101 in the manual retrieving lever 10, so that the lever 10 is easily withdrawable away from the main body by grasping the knob 11 and turning the lever 10 about the pivot 18 which is retained in position by the tapered portions 32.

Accordingly, the lever 10 is manually withdrawn by means of the knob 11, turned through 90 degrees about the pivot 18 and then pushed forwardly or toward the main body, with the result that the lever 10 advances through the inlet 31 of the lower restraining plate 26 and tapered portion 271 of the upper restraining plate 27 while being restrained vertically and laterally by the plate 26 and groove 272 of the plate 27 until the forward end of the lever engages the forward flange or bent portion 30. The parts are now in the position shown in FIG. 12.

Figure 3:
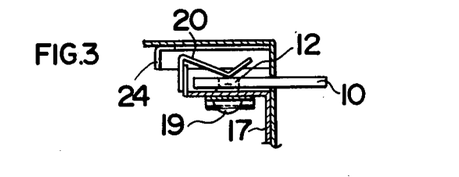
FIGS. 3 and 4 are sectional views taken along the line A—A and line B—B in FIG. 2 respectively.
Figure 4:
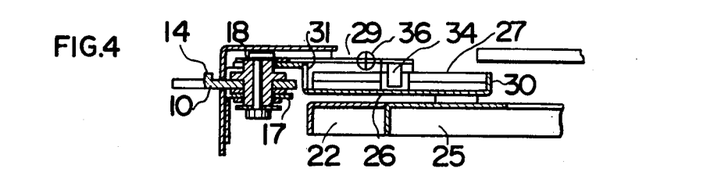

In this position, the latch lever 29 is held retracted from its latching position by the engagement of the arm 38 with the pivot 18, but as the lever 10 is further advanced or pushed in, the first and second carriages 25, 22 are moved in the Y direction by virtue of the contact between the guide face 240 and the guide roller 261 and brought to the position shown in FIG. 3. With the arm 38 brought out of contact with the pivot 18 by this movement, the engaging pin 34 engages in the cutout 15, thus connecting or drive coupling the lever 10 to the first carriage 25 to form an integrally moveable unit.

The manual retrieving lever 10, when withdrawn from the accommodating portion, is brought out of contact with the actuating piece 121 of the microswitch 120, which in turn disables or holds the automatic retrieving mechanism out of operation through an unillustrated suitable electric circuit. Thus the automatic retrieving mechanism is unable to operate even if an operating button 2 is inadvertently depressed.

The first carriage 25 bearing a microfiche film is now freely moveable in the X and Y directions by manipulating or manually operating the manual retrieving lever 10 to bring the desired frame to the projection position.

The apparatus is changed over from manual retrieval to automatic retrieval by following a procedure reverse to that described above. The manual retrieving lever 10 is removed from the first carriage 25 and returned to the accommodating portion, whereupon the actuating piece 121 of the microswitch 120 engages the side portion of the lever 10 as seen in FIG. 15. Consequently the automatic retrieving mechanism which has been held out of operation by way of the unillustrated electric circuit during manual retrieval is made operable.

When the desired operating buttons 2 are depressed, the automatic retrieving mechanism operates, driving the first carriage 25 and the second carriage 22 from the position shown in FIG. 15 and moving the unlocking pin 221 out of contact with the cam portion 112 of the locking plate 110, whereupon the plate 110 moves in the direction of the arrow a into engagement with the cutout 101 of the lever 10. The lever 10 is thus locked in the accommodating portion. During automatic retrieval, the lever 10 is not withdrawable from the accommodating portion and the manual retrieving mechanism is held out of operation in a disabled condition.

In this state, the microfiche bearing first carriage 25 is moved suitably in the X and Y directions by the automatic retrieving mechanism to bring the frame specified by the buttons 2 to the projection position. After the image of the frame has been projected onto the screen 3, the first and second carriages 25 and 22 are returned to the position shown in FIG. 15.

The first and second carriages 25 and 22 in FIG. 15 are located in the position where the microfiche film can be loaded on the first carriage 25, so that a microfiche film of unspecified format is manually retrievable immediately on placement on the carriage. However, the manual-automatic retrieval change-over position need not always be limited to the position of FIG. 15. The manual retrieving lever 10 may be provided as a separate member which is completely detachable from the main body.

Briefly, in a microfiche reader apparatus comprising a mechanism for automatically retrieving the frame to be projected and a manual retrieving mechanism including a manual retrieving lever retainable in an accommodating portion and withdrawable therefrom for manually retrieving the desired frame, the present invention provides the combination of a member for locking the manual retrieving lever in the accommodating portion, a member for releasing the lever from the locking member when the automatic retrieving mechanism is out of operation, and a switching member for permitting the operation of the automatic retrieving mechanism only while the lever is retained in the accommodating portion. Because of this construction, the apparatus avoids any likelihood of the interior mechanism being damaged consequent to the application of the manual retrieving lever during automatic retrieval or of the automatic retrieving mechanism being inadvertently actuated during manual retrieval.

We claim:

1. In a microfiche reader apparatus or the like including an automatic retrieving mechanism comprising a first carriage moveable in a first direction and supporting thereon a microfiche and a second carriage moveable in second direction which is orthogonal to said first direction and moveably supporting said first carriage thereon;
   a manual retrieving mechanism including a stationary guiding means affixed to said apparatus and having an elongated slot and a manual retrieving lever means having an elongated slot, a pivotal shaft means engaging and being moveable along said elongated slots and said lever means being so positioned to have its elongated slot perpendicular to the elongated slot of said guiding means; and
   means coupling said manual retrieving lever means with said first carriage so as to enable movements of said first and second carriages by the manual operation of said lever means.

2. In a microfiche reader apparatus or the like comprising an automatic retrieving mechanism including first and second carriages moveable in first and second directions orthogonal to one another with said first carriage carrying a microfiche and being moveably supported by said second carriage;
   manual retrieving lever means pivotally moveable between first and second positions and having an elongated slot;
   stationary guiding means affixed to said apparatus having an elongated slot parallel to said elongated slot of said lever means when said lever means is at said first position;
   shaft means pivotally engaging both said elongated slots and being slideable at least along the elongated slot of said guiding means, said lever means being pivotable to said second position about said shaft means so as to have its elongated slot perpendicular to said elongated slot of said guiding means; and
   means coupling said lever means with said first carriage, the manual operation of said lever means in first and second directions permitting moving the carriages so as to bring a preselected frame of microfiche to a predetermined position.

3. The apparatus as claimed in claim 2 further including switch means for connecting said automatic retrieving mechanism to a source of power and being actuatable when said lever means is moved out from said first position to disconnect said automatic retrieving means from said power source.

4. A microfiche projector including a projection station comprising:
   a film carrier;
   means supporting said film carrier for movement through said projection station along mutually orthogonal directions;
   an electrically powered automatic retrieving means for automatically transporting said carrier to automatically bring preselected portions of a microfiche on said carrier into registry with said projection station; and
   manual retrieving means for manually transporting said carrier through said projection station and including a handle member transferrable between a retracted inoperative position and an advanced operative position and means releasably coupling said handle member to said carrier to be moveable therewith, said handle when in said retracted position being uncoupled from said carrier.

5. The microfiche projector of claim 4 wherein said automatic retrieving means includes an electric motor and transmission means releasably coupling said motor to said carrier and further comprising means for uncoupling said motor from said carrier.

6. The microfiche projector of claim 4 including means for enabling and disabling said automatic retrieving means in response to said handle member being in its inoperative and operative position respectively.

7. The microfiche projector of claim 4 including means for locking said handle in its retracted inoperative position and for releasing said handle member for transfer to its operative position in response to said carrier being located in a predetermined position.

8. The microfiche projector of claim 4 wherein said automatic retrieving means includes an electric motor and a slipping transmission coupling said motor to said carrier.

9. The microfiche projector of claim 4 wherein said manual retrieving means comprises a first elongated linear track, said handle member including a second elongated linear track, and means swingably supporting said handle and slideably engaging said first and second tracks.

10. The microfiche projector of claim 4 including means for releasably locking said handle member in coupled condition to said carrier and for releasing said locking means in response to said carrier member being in a predetermined position.

* * * * *